(12) United States Patent
Englander

(10) Patent No.: US 6,962,422 B1
(45) Date of Patent: Nov. 8, 2005

(54) SINGLE SHELL, DOUBLE VIEW MIRROR FOR VEHICLES

(75) Inventor: Benjamin Englander, Jamaica, NY (US)

(73) Assignee: Roscoe, Inc., Jamaica, NY (US)

( * ) Notice: Subject to any disclaimer, the term of this patent is extended or adjusted under 35 U.S.C. 154(b) by 0 days.

(21) Appl. No.: 08/711,810

(22) Filed: Sep. 10, 1996

Related U.S. Application Data

(60) Provisional application No. 60/009,784, filed on Jan. 16, 1996.

(51) Int. Cl.$^7$ .......................... G02B 5/08; G02B 7/182; B60R 1/06
(52) U.S. Cl. ..................... 359/864; 359/865; 359/877; 359/881; 359/841; 248/478; 248/479; 248/486
(58) Field of Search .................... 359/850, 855, 359/864, 865, 872, 877, 881, 507, 841, 871; 248/478, 479, 480, 486, 488, 477

(56) References Cited

U.S. PATENT DOCUMENTS

| 3,976,275 A | * | 8/1976 | Clark |
| 4,166,651 A | * | 9/1979 | Vandenbrink et al. |
| 4,306,701 A | * | 12/1981 | Nierhaus et al. |
| 4,311,362 A | * | 1/1982 | LaPorte |
| 4,678,294 A | * | 7/1987 | Van Nostrand ............. 359/865 |
| 4,854,539 A | * | 8/1989 | Glue |
| 5,069,410 A | * | 12/1991 | McKee |
| 5,081,546 A | * | 1/1992 | Bottrill ....................... 359/841 |
| 5,115,352 A | * | 5/1992 | do Espirito Santo ........ 359/855 |
| 5,295,021 A | * | 3/1994 | Swanson .................... 359/865 |
| 5,364,058 A | * | 11/1994 | Shepherd .................... 248/479 |
| 5,621,577 A | * | 4/1997 | Lang et al. ................. 359/872 |
| 5,687,035 A | * | 11/1997 | Lang .......................... 359/864 |
| 5,889,627 A | * | 3/1999 | Englander et al. .......... 359/864 |

* cited by examiner

Primary Examiner—Ricky D. Shafer
(74) Attorney, Agent, or Firm—Ostrolenk, Faber, Gerb & Soffen, LLP

(57) ABSTRACT

A single shell side-view mirror assembly is disclosed which provides improved aerodynamic features and improved vibrational resistance characterized by an aerodynamically domed shell structure, interchangeable mirror elements, an electrically activated vibration dampening element and a static vibration dampening elements.

20 Claims, 9 Drawing Sheets

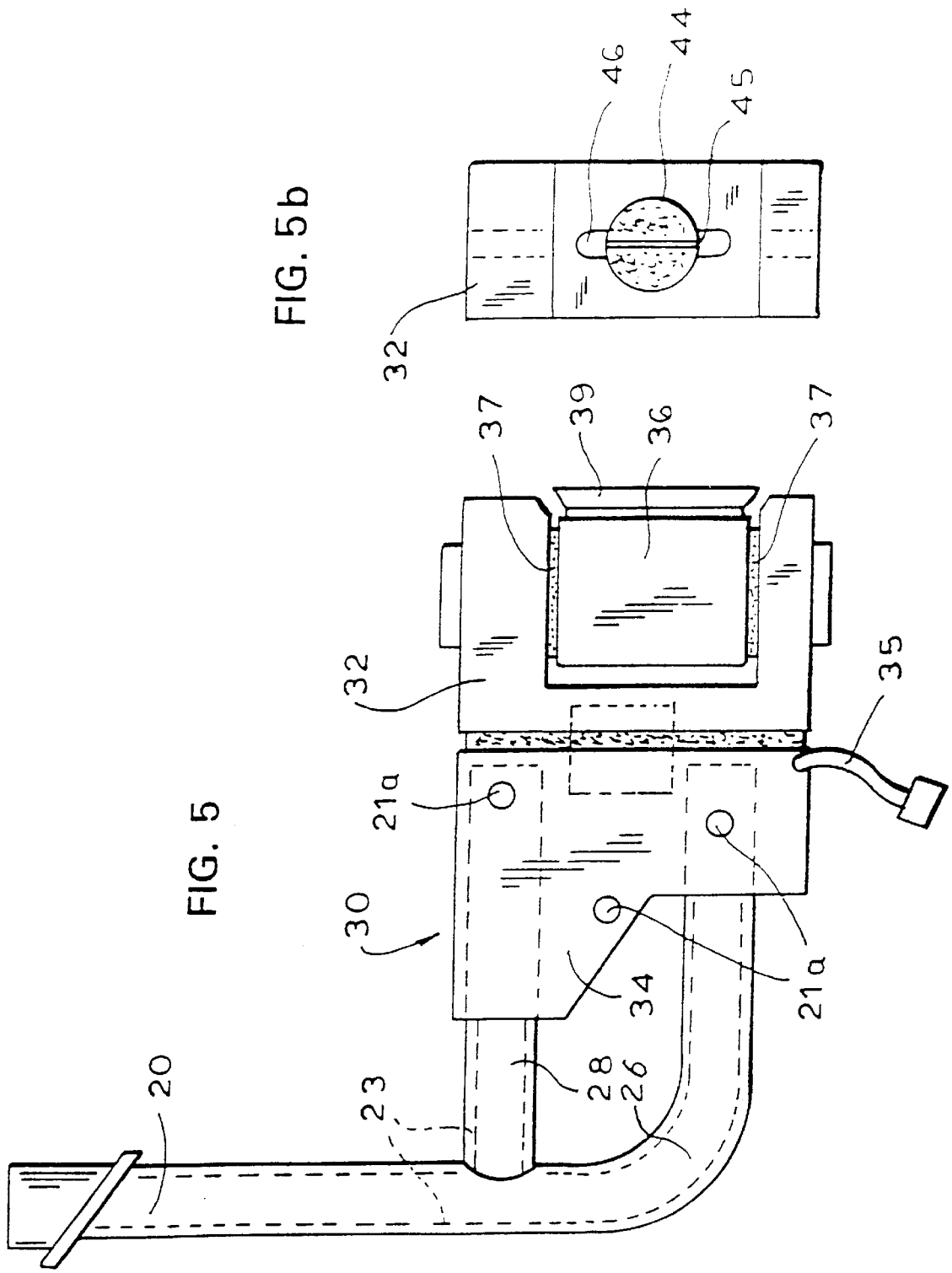

SINGLE SHELL, DOUBLE VIEW MIRROR FOR VEHICLES

CROSS REFERENCE TO RELATED APPLICATION

Under the provisions of 35 U.S.C. §120, this application claims priority to related U.S. Provisional Application No. 60/009,784, filed Jan. 16, 1996 and entitled SINGLE SHELL, DOUBLE VIEW MIRROR FOR VEHICLES.

BACKGROUND OF THE INVENTION

The present invention generally relates to safety devices for vehicles and, in particular, to a side-view mirror assembly for a vehicle in the form of a motorized, single shell, dual view, side-view mirror.

Side-view mirrors for large vehicles such as school buses, transit buses and trucks present special design challenges. Specifically, because of the height and size of the vehicles, it is necessary to provide an ample viewing area for a long distance along the side of the vehicle, as well as a view which is directed more toward the ground. Conventionally, separate mirror elements have been provided for these diverse viewing requirements. For example, one mirror element has been traditionally mounted to provide a unique field of view by way of a large flat mirror surface and another mirror element has been provided with a convex surface to provide a wider field of view. These prior art mirror elements, while serving their intended functions, also have the unintended and undesired result that they obscure a substantial field of view forward of the mirror assemblies.

SUMMARY OF THE INVENTION

Accordingly, it is an object of the present invention to provide a more effective, improved mirror assembly for vehicles such as school buses, transit buses, trucks and the like.

Another object of the invention is to provide a mirror assembly for vehicles which is diverse and easier to use.

Another object of the present invention is to provide a mirror assembly with superior vibration damping features and aerodynamic features for an improved field of view.

In accordance with the present invention, a vehicular side-view mirror assembly has a shell housing; a first and a second mounting element disposed in the shell housing; a first mirror unit having a first side-view mirror, where the first mirror unit is connected to the first mounting element and where the first mirror unit is independently adjustable. The side-view mirror assembly also has a second mirror unit having a second side-view mirror, where the second mirror unit is connected to the second mounting element and where the second mirror unit is independently adjustable. Still further, the mirror assembly has a support member for coupling the shell housing to the vehicle.

The foregoing and numerous other objects of the invention are realized with a mirror assembly which is described below by reference to the drawings and detailed description which follows.

BRIEF DESCRIPTION OF THE DRAWINGS

FIG. 5 is a side view of the mirror pole assembly of the present invention to which the shell housing is attached;

FIG. 5b is a side view of a first housing member of the mirror pole assembly of the present invention;

DETAILED DESCRIPTION OF EMBODIMENTS OF THE INVENTION

Figure 1:
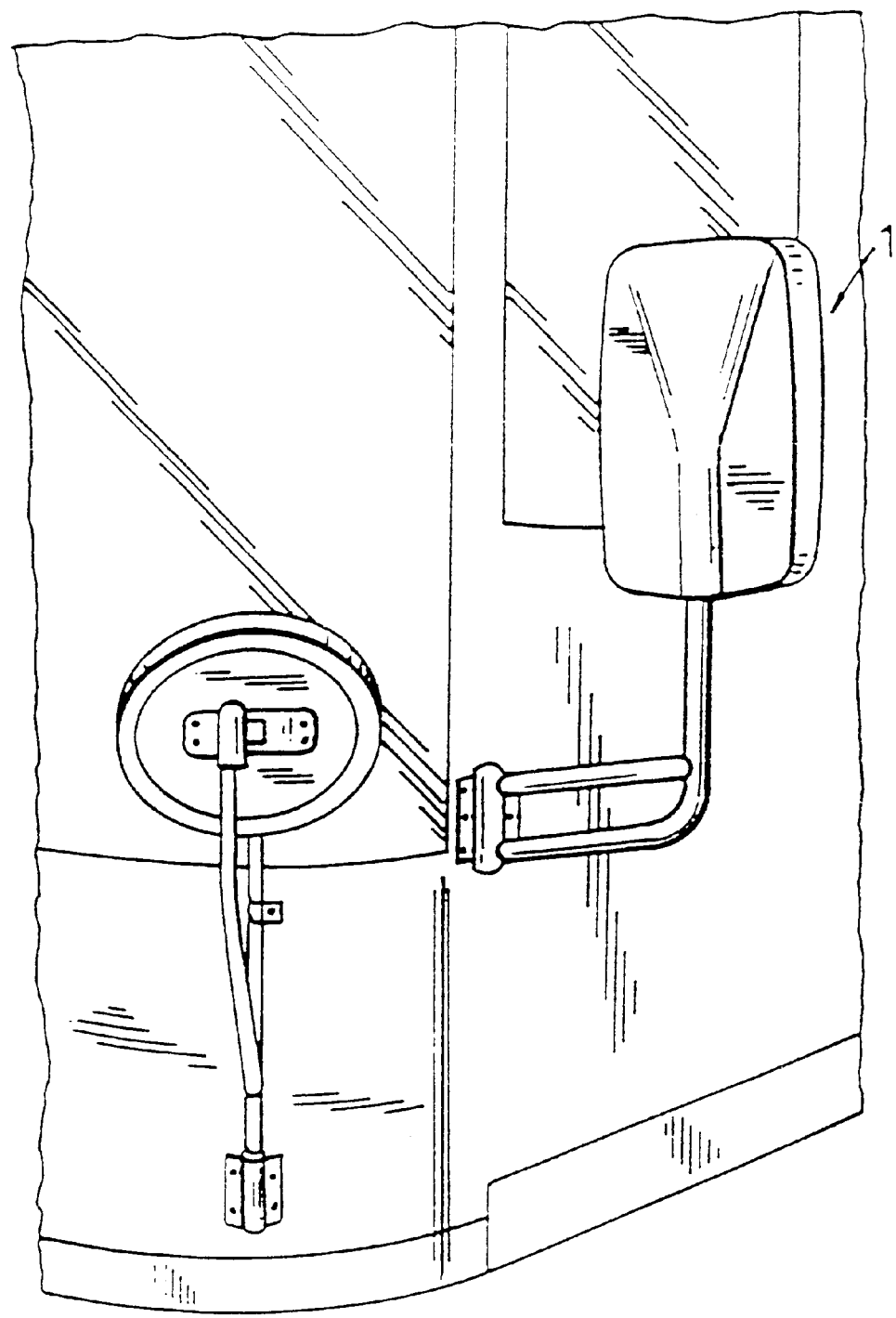
FIG. 1 is a perspective view of the mirror assembly mounted to a school bus and providing a side-view view thereof in accordance with the present invention.
Figure 2:
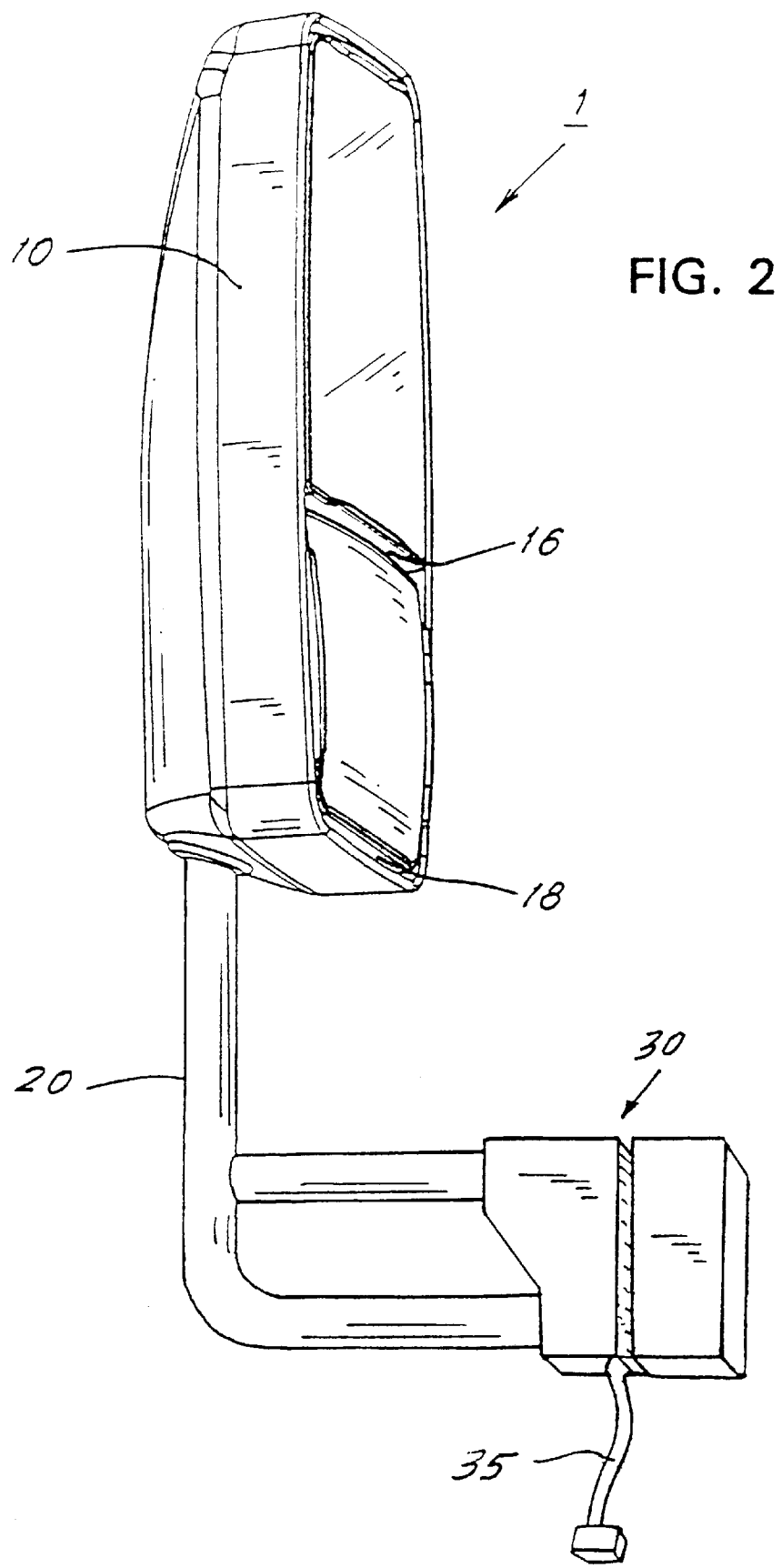
FIG. 2 is a perspective view of the mirror assembly of the present invention from the front and not mounted to a vehicle.

With reference to FIG. 1, the mirror assembly 1 of the present invention is mounted to a school bus and provides an ample field of view along the side of the vehicle as well as a view which is directed more towards the ground. FIG. 2 shows a mirror assembly 1 which is not mounted to a vehicle. The mirror assembly 1 comprises a shell housing 10, a mirror pole 20 and a hinge member 30. The shell housing 10 has a substantially rectangularly shaped opening 14 and interior space and contains a rectangularly shaped first mirror unit 16 and a convex-surfaced second mirror unit 18. An electrical cable section (or harness) 35 extends from the hinge member 30 for providing electrical connections between a motor control switch (not shown) and the motors (not shown) contained in the first mirror unit 16 and the second mirror unit 18.

The exploded view (FIG. 3) of the mirror assembly 1 of the present invention shows first and second mirror units 16, 18 which are mounted in the shell housing 10 such that the reflecting surfaces of the mirrors 60, 80 lie substantially parallel to the plane of the opening 14. Mounting hole 11 provides an opening for the mirror pole 20 to enter the shell housing 10. A grommet 22 is disposed in the mounting hole 11 and prevents moisture, dirt and the like from entering the shell housing 10 through the mounting hole 11. The mirror pole 20 comprises a first support arm 26 and a second support arm 28 each having a mounting hole 21 on its distal end.

Note that the mirror assembly 1 may be mounted on a vehicle body such that the shell housing 10 is below the hinge member 30 thereby being in the opposite vertical orientation from that shown in FIGS. 2 and 3. When the mirror assembly 1 is in such opposite, vertical orientation, the grommet 22 also prevents water, dirt of the like from entering the shell housing 10 through the mounting hole 11.

Figure 4:
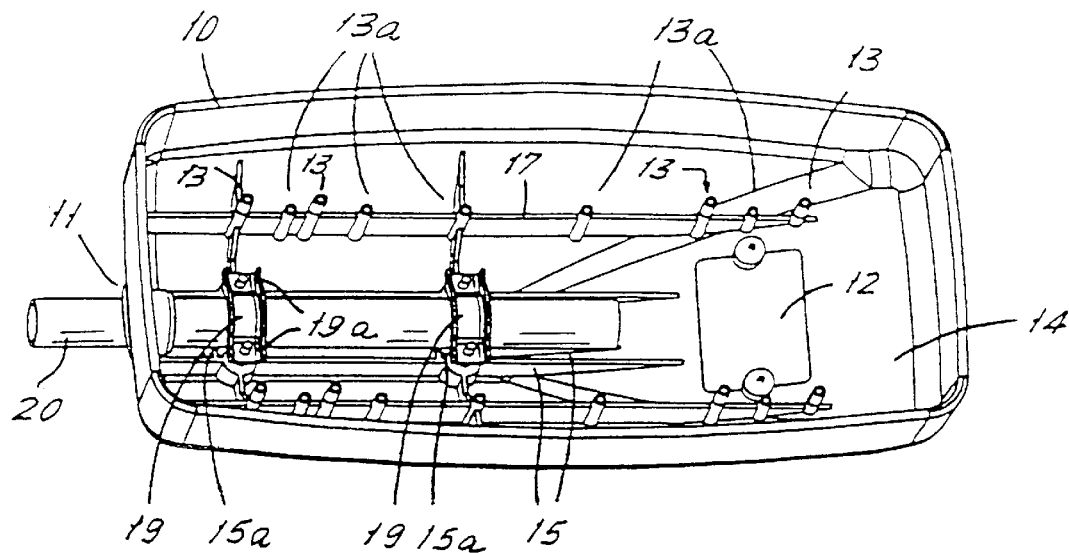
FIG. 4 is a perspective view of a shell housing of the mirror assembly of the present invention with the mirror elements removed.

With reference to FIG. 4, the shell housing 10 comprises a mounting hole 11, clamping plates 19, and longitudinal reinforcing ribs 15 for accepting the mirror pole 20 and operatively connecting the shell housing 10 and the mirror pole 20. The mirror pole 20 is disposed through the mounting hole 11 and under the clamping plates 19. The longitudinal reinforcing ribs 15 are disposed along the wall of the shell housing 10 to provide structural reinforcement for clamping the mirror pole 20 to the shell housing 10. The height of the outermost longitudinal reinforcing ribs 15, with respect to the wall of the shell housing 10, are higher than the innermost longitudinal reinforcing ribs 15 thereby defining an arcuate cross section (or resting surface) for snugly engaging the mirror pole 20. Orthogonal reinforcing ribs 15a are disposed near the clamping plates 19 to provide additional structural support. The clamping plates 19 are securely engaged against the mirror pole 20 via rear entry bolts 19a.

Figure 4A:
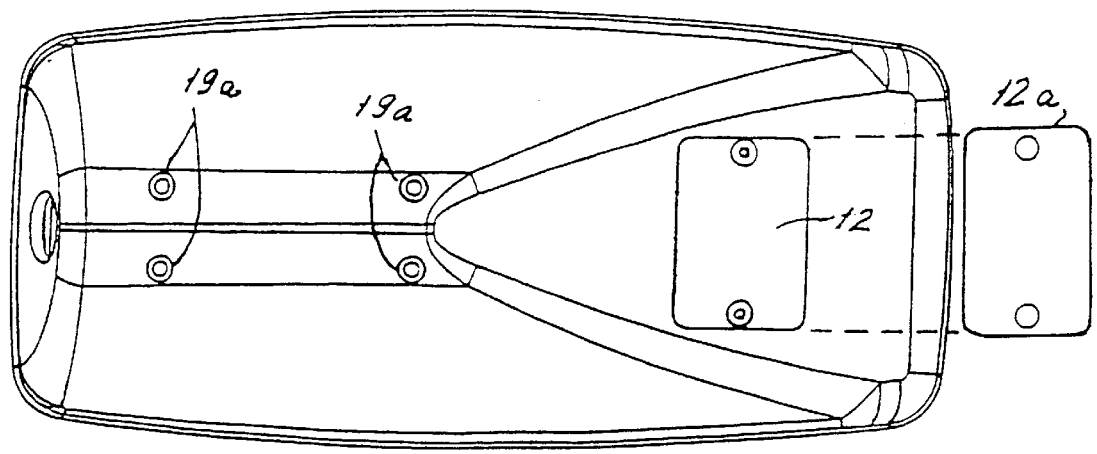
FIG. 4a is a view of the windward side of the mirror assembly of the present invention.

As best seen in FIG. 4a, the rear entry bolts 9a are tightened from the rear (windward) side of the shell housing 10. The shell housing 10 is provided with countersunk holes which accept the rear entry bolts 19a and permit sub-flush disposition of the bolts 19a. Further, rubber covers (not shown) are disposed over the countersunk holes to provide a smooth and flush finish on the windward side of the shell housing 10 which adds to the aerodynamic design of the shell housing 10.

As best seen in FIG. 2, the housing shell 10 is aerodynamically shaped. Specifically, the forward surface of the shell housing 10 is narrow and tapers outward toward the opening 14, which accepts the mirror units 16, 18. Therefore, wind resistance and vibrations caused by wind velocity are reduced and the tendency for the shell housing 10 to shift or turn as a result of torsional forces developed on the mirror pole 20 from wind are mitigated.

The shell housing 10 further comprises a cover 12a which snugly fits over the maintenance opening 12. As will be discussed in more detail below, the maintenance opening 12 provides access to the cabling between various electrical components of the mirror assembly 1. The cover 12a fits flush with respect to the surface of the shell housing 10 thereby maintaining the aerodynamic features of the mirror assembly 1. Furthermore, the cover 12 provides a surface for the display of a company name, trademark or other indicia, which display can be easily changed without requiring re-stenciling of the shell housing 10 of the mirror assembly 1. Rather, the simple and inexpensive step of replacing the cover 12a with a new cover displaying the new indicia completes the process.

Referring to FIG. 4, the shell housing 10 is provided with oppositely disposed supporting ribs 17 which extend along the wall of the shell housing 10 and terminate on end surfaces of the shell housing 10. Integral with the supporting ribs 17 are long standoffs 13 and short standoffs 13a. Four long standoffs 13 are disposed at each of the ends of the shell housing 10. Ten short standoffs 13a are disposed between the long standoffs 13 and are also integral to the support ribs 17. As will be discussed below, the long standoffs 13 and the short standoffs 13a provide a supporting structure for the first and second mirror units 16, 18.

Figure 5A:
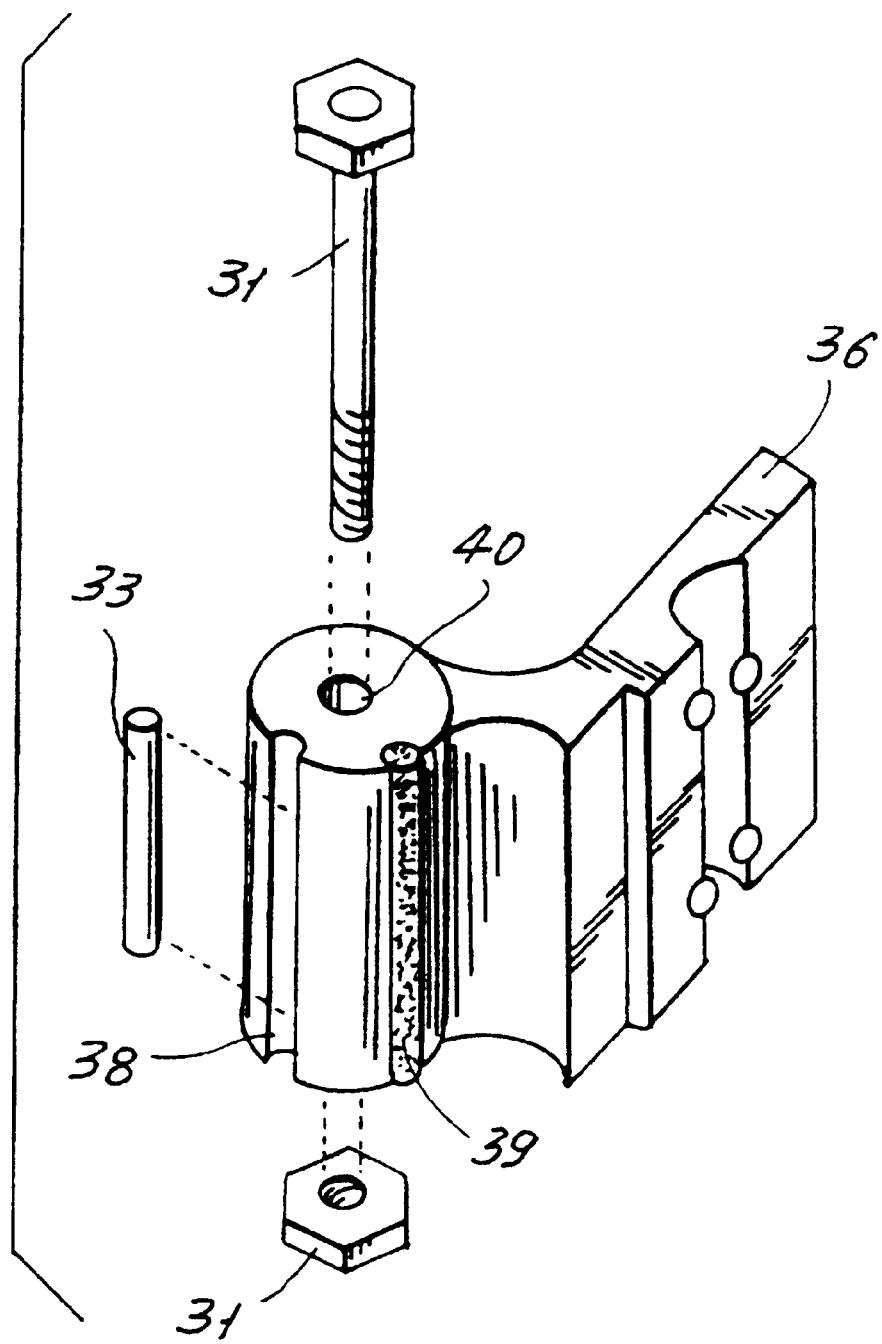
FIG. 5a is a perspective view of a hinge plate of the mirror pole assembly of the present invention.

With reference to FIG. 5, the mirror pole 20 and the hinge member 30 are shown. The hinge member 30 comprises a first housing member 32 and a second housing member 34 which fit snugly around the first and second support arms 26, 28. As shown in FIG. 5a, hinge plate 36 operatively connects to the first housing member 32 via a nut and precision bolt 31 and anti-scoring washers 37.

First and second support arms 26, 28 which extend from the mirror pole 20 are insertable into the hinge member 30 by way of arcuate recesses in the first and second housing members 32, 34 of the hinge member 30. More specifically, the second housing member 34 is removable from the first housing member 32 thereby exposing the arcuate recesses for engaging the first and second support arms 26, 28. The first and second support arms 26, 28 are inserted into the arcuate recess of the first housing member 32 and the mounting holes 21, disposed on the distal ends of first and second support arms 26, 28, are lined up with the holes 21a of the first and second housing members 32, 34. Allen-type bolts are inserted into the holes 21a which clamp the first and second housing members 32 and 34 together and further engage the first and second support arms 26, 28 of the mirror pole 20.

The second housing member 34 of the hinge member 30 operatively connects to the hinge plate 36 via a nut and a precision bolt 31 (FIG. 5a), anti-scoring washers 37 and a precision bore 40. Thus, the precision bolt 31 passing through the first housing member 32, the anti-scoring washers 37 and the precision bore 40 of the hinge plate 36 enable the hinge plate 36 to swivel with respect to the first housing member 32. Accordingly, the mirror assembly 1 can swivel with respect to the vehicle to which it is mounted if sufficient force is exerted in torsional relation to the hinge member 30.

Further, anti-scoring washers 37 mitigate any deterioration in the precision dimensions of the hinge plate 36 and, in particular, the precision bore 40 when the hinge plate 36 is swiveled in relation to the first housing member 32. It is preferred that anti-scoring washers 37 be fabricated from a softer material than the hinge plate 6. For example, when the hinge plate 6 is formed of steel, it is preferred that the anti-scoring washers 37 be fabricated from brass.

The first housing member 32 and the hinge plate 36 are provided with a detent means for fixing the relative position of the hinge plate 36 with respect to the first housing member 32. Specifically, the first housing member 32 is provided with a cavity 42. Cavity 42 contains a spring (not shown) and a piston 44 disposed forward of the spring and extending beyond the surface of the first housing member 32. As best seen in FIG. 5b, the piston 44 comprises a channel 45 extending diametrically across the top surface of the piston 44. The surface of the first housing member 32 comprises a cooperating notch 46 with the channel 45 in the piston 44 for engagement with a detent member 33. When the hinge plate 36 is in position, with the precision bolt 31 passing through the first housing member 32 and the precision bore 40 of the hinge plate 36, the detent member 33 operatively engages both the channel 45 and an inward detent 38 of the hinge plate 36. The notch 46 in the surface of the first housing member 32 provides relief for accepting the detent member 33 so that the detent member does not contact the first housing member 32. Thus, the hinge plate 36 is held in a fixed relationship with respect to the first housing member 32 and, accordingly, the mirror assembly 1 is held in a fixed relationship with respect to the vehicle to which it is attached.

However, sufficient torsional force on the hinge plate 36 with respect to the first housing member 32 will force the piston 44 inwardly and release the detent member 33 from the channel 45 and the inward detent 38, thereby permitting swingable movement of the mirror pole 20 with respect to the hinge plate 36. When the hinge plate 36 is rotated sufficiently with respect to the first housing member 32, the outward detent 39 will engage the channel 45 of the piston 44 and the hinge plate 36 will again be fixed in position relative to the first housing member 32, but at a different position. The cooperation of the outward detent 39 and the channel 45 of the piston 44 define a maximum rotational position to prevent vehicle damage when the mirror assembly 1 is rotated with respect to the vehicle, for example, when an object is struck while in motion.

Moreover, the precise sizing of the precision bolt 31 and the precision bore 40 coupled with the high force provided by the spring, the channel 45, the detent member 33, and the inward detent 38, minimizes vibrations developed during vehicular travel, which vibrations tend to propagate through the hinge plate 36, the hinge member 30 and the mirror pole 20 to the first and second mirror units 16, 18.

Furthermore, for large vehicles, the first and second support arms 26, 28 are extended and protrude much further from the arcuate recesses of the first and second housing members 32, 34. To mitigate against vibrations developing in the support arms 26 and 28, a core material 23 is added to the inside volume of the first and second support arms 26, 28 and the mirror pole 20. It is preferred that the core material 23 is of a dissimilar metal than that of the mirror pole 20 and the first and second support arms 26, 28 because experiments have shown that vibrations are reduced when dissimilar metals are used. Specifically, it is preferred that the mirror pole 20 and the first and second support arms 26, 28 are fabricated from steel tubing and the core material 23 is fabricated from aluminum tubing.

The novel, sturdy and aerodynamic features of the shell housing 10, the mirror pole 20 and the hinge member 30, described above, enable one-point connection of the mirror assembly 1 to the vehicle via hinge plate 36 without sacrificing vibration dampening characteristics.

Figure 6:
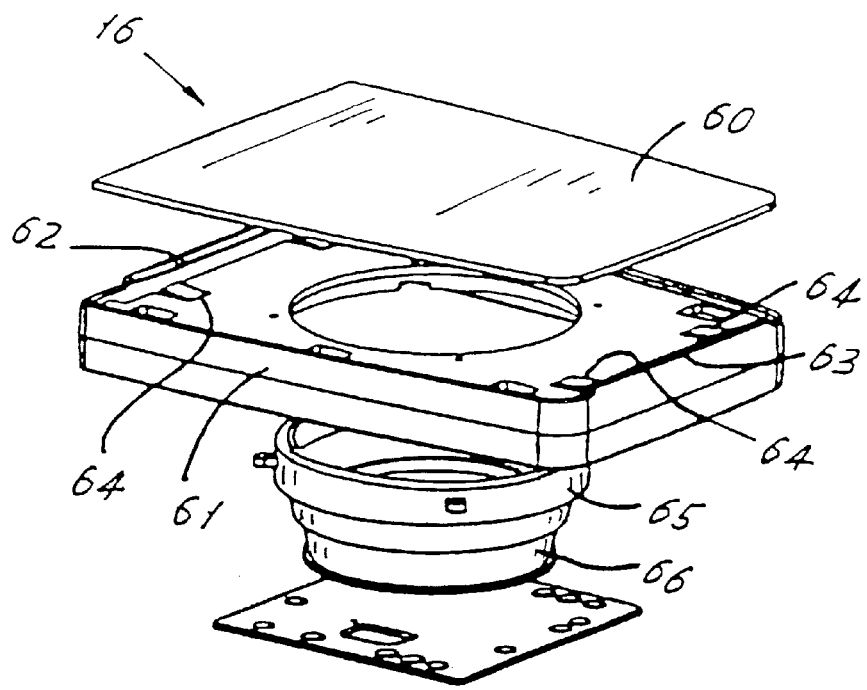
FIG. 6 is an exploded perspective view of a mirror unit of the present invention.

With reference to FIG. 6, the rectangularly shaped first mirror unit 16 is shown in greater detail. The first mirror unit 16 comprises a flat mirror 60, a flat mounting plate 61, a cup 65 and a swivel mechanism 66. The swivel mechanism 66 moves in relationship to the cup 65. The cup 65 is dome shaped on the bottom and operatively engages the dome shaped member of the swivel mechanism 66 which provides a swivelling motion in both horizontal and vertical directions. Gearing and swivel members (not shown) are connected to the cup 65 and to two motors (not shown) of the swivel mechanism 66 to enable motorized swiveling of the cup 65 with respect to the swivel mechanism 66 in a manner well known in the art. A boot (not shown) covers the critical elements of the swivel mechanism 66 and the cup 65 to prevent debris from deteriorating the operation of the first mirror unit 16.

The flat mirror 60 is disposed on a flat mounting plate 61 and secured at its edges by a long snap 62 and a short snap 63. Relative ease of installation of the flat mirror 60 onto the flat mounting plate 61 is achieved by first inserting one edge of flat mirror 60 under one of the long snap 62 and the short snap 63 and then pressing the other end of flat mirror 60 under the remaining snap to obtain secure engagement of the flat mirror 60 to the flat mounting plate 61. It is preferred that one edge of the flat mirror 60 is first placed under the long snap 62 and then the other end of flat mirror 60 is snapped under short snap 63.

The ease with which the flat mirror 60 is secured to, and removed from, the flat mounting plate 61 enables field replaceability and retrofitability of the flat mirror 60, for example, when the flat mirror 60 is accidentally broken.

Vibration tabs 64 extend somewhat above the plane of the flat mounting plate 61 and are elastically biased to engage the rear surface of the flat mirror 60 when the mirror is engaged under the long snap 62 and the short snap 63. The force exerted by the vibration tabs 64 to the rear surface of the flat mirror 60 prevents vibrations in the flat mirror 60 when the vehicle is in motion or when vibrations are transmitted to the first mirror unit 16 from other sources such as, for example, from the engine of the vehicle.

Figure 6A:
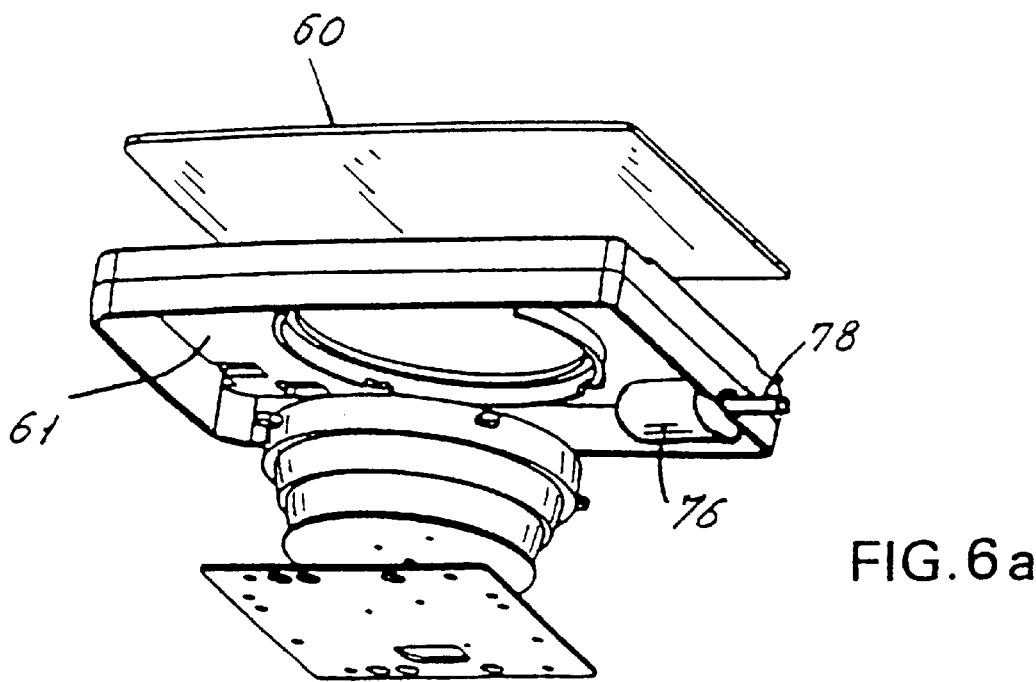
FIG. 6a is an exploded perspective rear view of the mirror unit of FIG. 6.

With reference to FIG. 6a, an electro-mechanical solenoid 76 may be coupled to the mounting plate 61, which solenoid 76 comprises a core 78 and a spring (not shown). The mounting plate 61 is provided with a hole so that the core 78 projects out of the hole. The spring forces the core 78 outwardly from the solenoid body when the solenoid 76 is not energized. When the solenoid is energized, the core 78 moves inwardly and overcomes the force exerted by the spring, which spring tends to keep the core 78 in the outward position.

The solenoid 76 is positioned such that the core 78 contacts the inside surface of the shell housing 10 when the solenoid is not energized and the spring forces the core 78 into its outward position. Therefore, when the solenoid is not energized, vibrations of the flat mounting plate 61 with respect to the shell housing 10 are damped.

However, when it is desired that the position of the first mirror unit 16 be changed via the motors of the swivel mechanism 66, the solenoid 76 is concurrently energized with the motors (via the motor control switch) such that the core 78 is drawn inwardly and away from the inside surface of the shell housing 10 thus enabling free movement of the flat plate 61 with respect to the swivel mechanism 66. Further, when the first mirror unit 16 has reached the desired position and the motors of the swivel mechanism 66 are deactivated, the solenoid 76 is also deactivated and the core 78 returns to its resting position against the inside surface of the shell housing 10.

Figure 7:
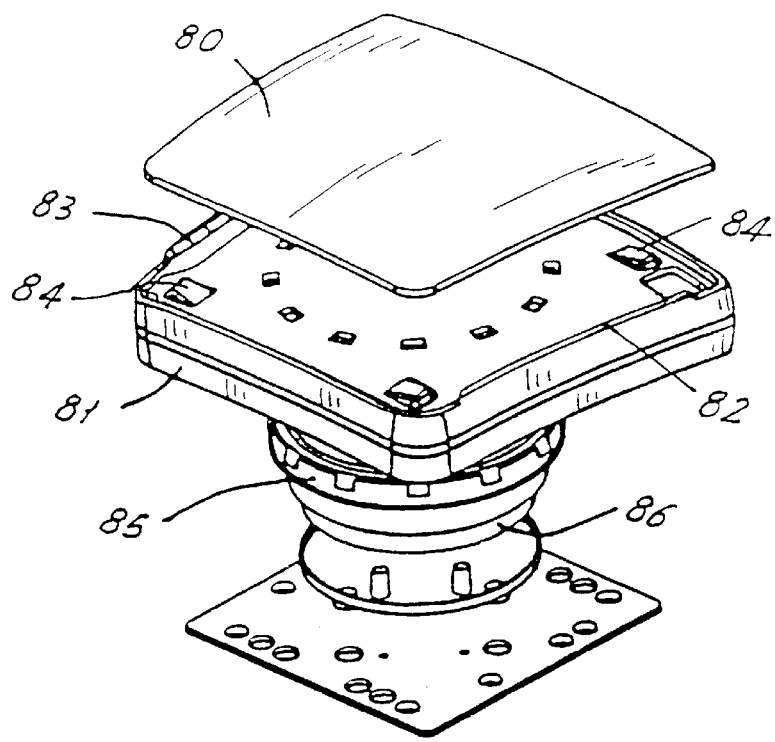
FIG. 7 is an exploded perspective view of a mirror unit of the present invention.
Figure 7A:
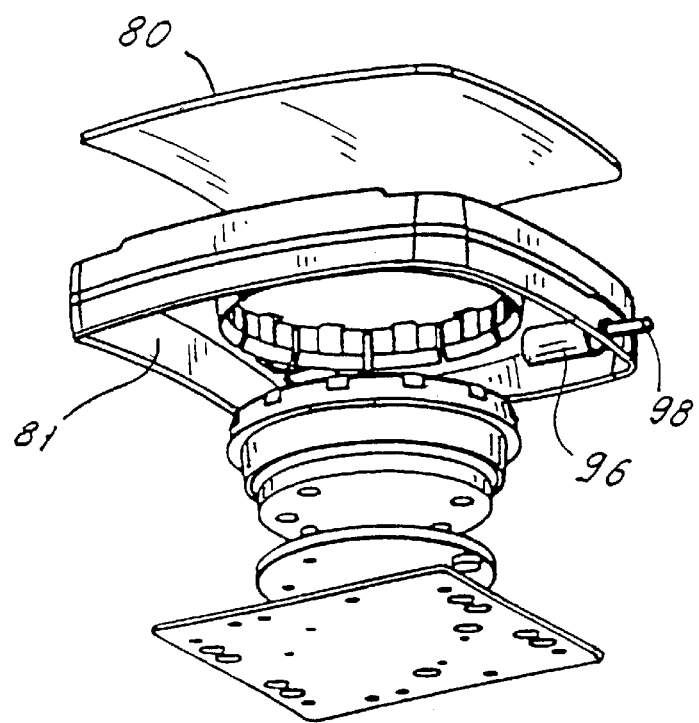
FIG. 7a is an exploded perspective rear view of mirror unit of FIG. 7.

With reference to FIG. 7, a more detailed drawing of the convex-surfaced second mirror unit 18 is shown. The second mirror unit 18 comprises a convex mirror 80, a convex mounting plate 81, a cup 85 and a swivel mechanism 86. The swivel mechanism 86 comprises two motors (not shown) which are coupled via gearing to the cup 85 to enable motorized swiveling of the cup with respect to the swivel mechanism 86. The convex mounting plate 81 comprises a long snap 82, a short snap 83, and vibration tabs 84. The swivel mechanism 86 may optionally comprise an electromechanical solenoid 96, as shown in FIG. 7a, where the solenoid comprises a core 98 and a spring (not shown). The operation of the motorized features and anti-vibration features of the convex-surfaced second mirror unit 18 are substantially similar to the same features of the rectangularly shaped first mirror unit 16 and, therefore, a detailed recitation of the interconnection and operation of the aforementioned elements of the second mirror unit 18 is omitted.

Figure 3:
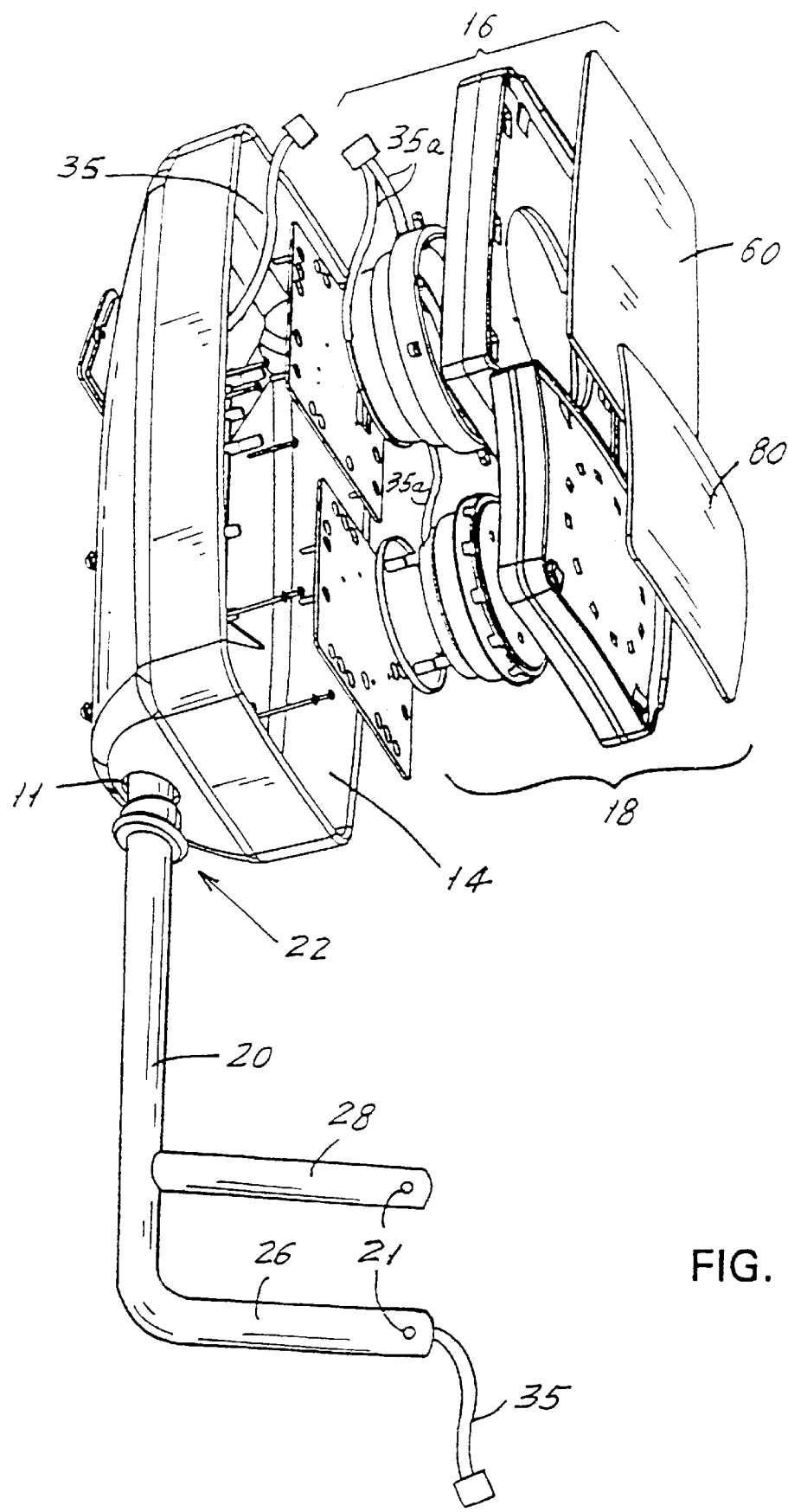
FIG. 3 is an exploded view of the mirror assembly of the present invention.

With reference to FIGS. 3, 4, 6 and 7, a description of the interconnections between the first and second mirror units 16, 18, and the shell housing 10 will now be described. The first mirror unit 16 may be positioned away from the mounting hole 11 towards one end of the shell housing 10 and the second mirror unit 18 may be positioned near the mounting hole 11 and below the first mirror unit 16 as shown in FIG. 3. However, when the end user is desirous to have the second mirror unit 18 positioned away from the mounting hole 11 towards one end of the shell housing 10 and the first mirror unit 16 positioned towards the mounting hole 11 and below the second mirror unit 18, the mirror assembly 1 is easily adapted.

For example, in some instances, attachment of the mirror assembly 1 to the vehicle requires that the hinge plate 36 be positioned above the shell housing 10, where the mounting hole 11 would be in a upward vertical orientation. In such a situation, the end user of the mirror assembly 1 may desire to have the first mirror unit 16 positioned above the second mirror unit 18 because of the unique optical characteristics of a convex mirror versus a flat mirror. Typically, mounting the mirror assembly 1 with the hinge plate 36 above the shell housing 10 would result in the convex-surfaced second mirror unit 18 being disposed above the rectangularly shaped first mirror unit 16. However, with the novel configuration of the shell housing 10 and the first and second mirror units 16, 18 of the present invention, an inversely mounted mirror assembly 1 (where the hinge plate 36 is mounted on the vehicle above the shell housing 10) would not necessarily result in the first mirror unit 16 being disposed beneath the second mirror unit 18. Indeed, the first and second mirror units 16, 18 may be readily interchanged and disposed at either end of shell housing 10.

Figure 8:
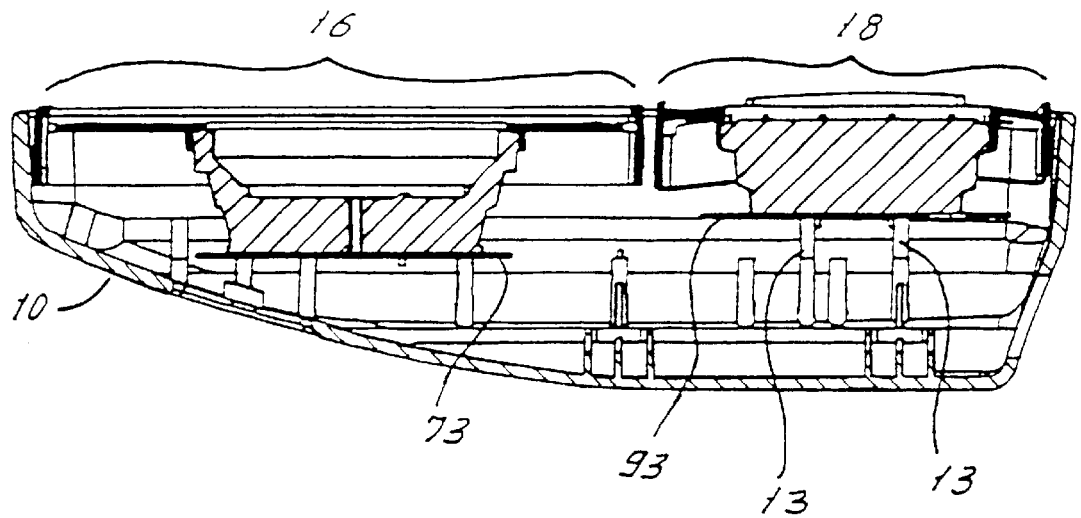
FIG. 8 is a cross-sectional view of the mirror assembly of the present invention.
Figure 9:
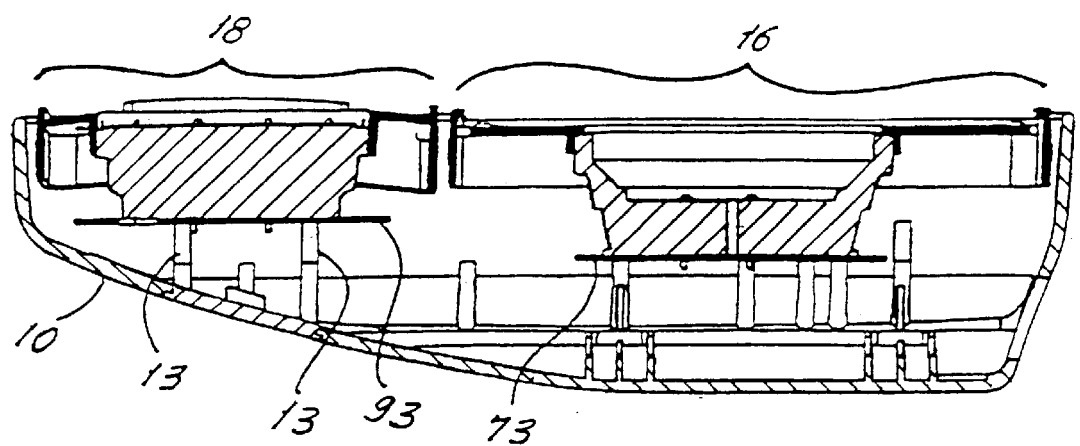
FIG. 9 is a cross-sectional view of the mirror assembly of the present invention.

To accommodate the above-described versatility (FIGS. 8 and 9), the long standoffs 13 are positioned at both ends of the shell housing 10 and operatively connect to the swivel mechanism 86 of the convex-surfaced second mirror unit 18 via connecting plate 93 when the second mirror unit 18 is disposed at one of the two ends of the shell housing 10. The short standoffs 13a, which are disposed between long standoffs 13 along the supporting ribs 17, operatively connect with the swivel mechanism 66 of the rectangularly shaped first mirror unit 16 via the connecting plate 73 when the first mirror unit 16 is disposed at one of the ends of the shell housing 10. The longs standoffs 13 and short standoffs 13a are sized such that the long standoffs 13 do not interfere with the connecting plate 73 of the rectangularly shaped first mirror unit 16, irrespective of which end of the shell housing 10 the first mirror unit 16 is disposed. Furthermore, if the end user is desirous of a single mirror unit rather than the first and second mirror units 16, 18 as discussed hereinabove, a larger mounting plate (of the flat-type or convex-type) may be integrated with a stationary cup and a swivel mechanism of the type described for the larger, rectangularly shaped first mirror unit 16. In such a situation, only the short standoffs 13a would be utilized to fasten the coupling plate of the single mirror unit to the shell housing 10.

The shell housing 10, the flat mounting plate 61, the cup 65, the swivel mechanism 66, the connecting plate 73, the convex mounting plate 81, the cup 85, the swivel mechanism 86 and the connecting plate 93 may be manufactured from suitable plastics, metals, composite materials or the like. It is preferred that the above-listed elements be manufactured from suitable plastics. The mirror pole 20 and the hinge member 30 may also be manufactured from suitable plastics, metals, composite materials or the like; however, it is preferred that these elements be manufactured from suitable metals. As described above, it is most preferred that mirror pole 20 and the first and second support arms 26, 28 be manufactured from steel and the core material 23 be manufactured from aluminum.

Installation of the mirror assembly 1 onto a vehicle requires cabling from the motor control switch (typically mounted inside the vehicle) to the respective motors of the swivel mechanism 66 and the swivel mechanism 86. Therefore, the electrical conductors of the electrical cables required to interconnect the electrical components of the mirror assembly 1 are bundled in heat shrinkable sleeves for stiffening and protecting the electrical conductors. The cable section 35 extends from an opening in the second housing member 34 through and to the opposite end of the mirror pole 20. The end of the cable 35 which extends from the bottom of hinge member 30 is electrically and mechanically connected to the electrical conductors of the motor control switch. The other end of the cable section 35 terminates near the maintenance opening 12 of the shell housing 10 when the mirror pole 20 is inserted through the mounting hole 11. A cable section 35a (as shown in FIG. 3) operatively connects to the respective motors of the first mirror unit 16 and the second mirror unit 18 and terminates near the maintenance opening 12 when the mirror units are installed in the shell housing 10. Therefore, after installation of both the mirror pole 20 and the first and second mirror units 16, 18 the electrical connection of the cable section 35 and the cable section 35a may be conveniently made through the maintenance opening 12.

Conversely, in mirror units of the prior art, cable connections are awkwardly made through a mounting hole (similar to mounting hole 11) or such connections are made before a mirror unit is installed into a housing.

Advantageously, the cover 12a of the present invention, which seals the maintenance opening 12, serves the dual purpose of sealing the shell housing 10 after required cable connections are made and provides a convenient and interchangeable surface for displaying a company name, trademark or other indicia.

Still further, the invention contemplates providing a heating element (not shown) inside the shell housing 10 to maintain the mirrors at a desired temperature, so as to prevent fogging or icing of the mirror elements 60, 80.

The mirror assembly 1 of the present invention can be constructed such that the shell housing 10 has a width of approximately 7½ inches and a height of approximately 13–14 inches. The depth of the shell housing 10 tapers toward the center, at its deepest point measuring approximately 3–4 inches.

The larger, first mirror unit 16 may have a width of approximately 6 to 7 inches and a height of approximately 9–10 inches. The smaller, second mirror unit 18 has a height of approximately 4 to 4½ inches and a width of approximately 7 inches. These dimensions are significant in that they have been selected to reduce the size of the blind spot in front of the mirror assembly while providing a more than sufficient rearward field of view, in full compliance with regulatory requirements.

Significant, advantageous and important benefits ensue from the present invention in that it is directly applicable to and mountable on school buses. It is self evident as well as understood that society and government are particularly anxious to provide special safety features for our youngsters during their travels to and from school. School buses are often operated by different drivers and it is imperative that each driver carefully position his/her school bus mirrors to ensure optimal viewing of the movement of both pupils and vehicles in and about the school bus. The present invention aids in achieving that objective in that it allows easy and rapid adjustment of mirrors which plays a significant roll in reducing accidents and protecting our youngsters.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

I claim:

1. A vehicular side-view mirror assembly for vehicle, comprising:

a shell housing having a first end and a second end;

a mirror mounting structure for holding a plurality of mirror units;

a first mirror unit having a first side-view mirror disposed thereon, the first mirror unit being independently adjustable and locatable by means of said mirror mounting structure in either of the first and second ends of the shell housing;

a second mirror unit having a second side-view mirror disposed thereon, the second mirror unit being independently adjustable and locatable by means of said mirror mounting structure in either of the first and second ends of the shell housing;

a support member for coupling the shell housing to the vehicle;

wherein the vehicular side-view mirror assembly of the mirror mounting structure includes;

first and second mounting elements disposed in the shell housing;

wherein the first mirror unit is connected to the first mounting element and the second mirror unit is connected to the second mounting element;

wherein the first mounting element of the shell housing comprises first standoffs for operatively engaging the first mirror unit at either end of the shell housing; and wherein the second mounting element of the shell housing comprises second standoffs for operatively engaging the second mirror unit at either end of the shell housing.

2. The vehicular side-view mirror of claim 1, wherein the first standoffs are longer than the second standoffs.

3. The vehicular side-view mirror of claim 1, wherein the shell housing has a domed cross section for providing aerodynamic characteristics which reduce vibration of the first and second mirrors and reduce torsional forces on the support member.

4. The vehicular side-view mirror of claim 1, wherein the shell housing further comprises a maintenance hole for enabling access to the interior of the shell housing when the first and second mirror units have been installed into the shell housing.

5. The vehicular side-view mirror of claim 4, wherein the maintenance hole is sealed with a removable cover plate.

6. The vehicular side-view mirror of claim 5, wherein the removable cover plate provides an external surface for displaying indicia.

7. The vehicular side-view mirror of claim 1, wherein the first side-view mirror is a flat mirror and the second side-view mirror is a convex mirror.

8. The vehicular side-view mirror of claim 1, wherein the first and second side-view mirrors are positioned in a substantially planar relationship with the edge of the shell housing.

9. The vehicular side-view mirror of claim 1, wherein the first and second mirror units comprise snap means for engageably securing the first and second mirrors respectively thereto so that field retrofitable replacement of the mirrors is obtained.

10. The vehicular side-view mirror of claim 1, wherein the first and second mirror units comprise vibration tabs which are elastically biased and engage the rear surface of the first and second mirrors to reduce vibration of the mirrors.

11. The vehicular side-view mirror of claim 1, wherein the support member comprises:

a hinge member; and a tube member for entering and engaging the shell housing on one end and operatively connecting to the hinge member on the other end.

12. The vehicular side-view mirror of claim 11, wherein the shell housing comprises a grommet disposed in a mounting hole which engages the tube member for preventing foreign matter from entering either of the shell housing and the tube member through the mounting hole.

13. The vehicular side-view mirror of claim 11, wherein the support member further comprises a core material disposed within the tube member for strengthening the tube member and reducing the vibration of the side-view mirror assembly.

14. The vehicular side-view mirror of claim 13, wherein the tube member is formed of a first metal material and the core material is formed of a second, dissimilar metal material to dampen vibrations of the tube member.

15. The vehicular side-view mirror of claim 14, wherein the tube member is formed of steel and the core material is formed of aluminum.

16. The vehicular side-view mirror of claim 11, wherein the tube member comprises first and second supporting tube members disposed in perpendicular relation and attached thereto for operatively engaging the hinge member.

17. The vehicular side-view mirror of claim 11, wherein the hinge member comprises:

a housing member, the housing member being engageable with the support member;

a hinge plate member, the hinge plate member being operatively engageable with the housing member and having attachment elements disposed thereon for rigidly fixing the hinge plate member to the vehicle, the hinge plate member having a precision bore for accepting a precision mounting bolt therethrough, which precision mounting bolt operatively engages the housing member and fixes the hinge plate member to the housing member in swingable relation, the precision dimensions of the bore and the bolt being sufficient to reduce vibrational movement between the hinge plate member and the housing member.

18. The vehicular side-view mirror of claim 17, wherein the housing member and the hinge plate member comprise:

a multi-position detent for fixing the hinge plate member relative to the housing member in a position of use, the multi-position detent exerting a force on the hinge plate member and housing member that resists swingable movement and reduces vibrations in the hinge member when the mirror assembly is in a position of use, the multi-position detent permitting swingable movement of the hinge plate member relative to the housing member when sufficient torsional force is exerted on the hinge plate member relative to the housing member such that the hinge plate member and housing member reach a position of maximum rotation wherein the multi-position detent again exerts a force on the hinge plate member and housing member that resists swingable movement therebetween.

19. The vehicular side-view mirror of claim 1, wherein the shell housing has a width of approximately 7½ inches, a height of approximately 13 to 14 inches and a depth which tapers towards the center and, at the deepest point, measures approximately 3 to 4 inches.

20. The vehicular side-view mirror of claim 1, wherein the first mirror unit has a width of about 6 to 7 inches and a height of about 9 to 10 inches and the second mirror unit has a height of about 4 to 4½ inches and a width of about 7 inches.

* * * * *